United States Patent [19]

Baumeister et al.

[11] Patent Number: 4,866,322

[45] Date of Patent: Sep. 12, 1989

[54] ELECTRICAL MACHINE, ESPECIALLY ELECTRIC MOTOR

[75] Inventors: Udo Baumeister; Bernd Walther, both of Bietigheim-Bissingen, Fed. Rep. of Germany

[73] Assignee: SWF Auto-Electric GmbH, Bietigheim-Bissingen, Fed. Rep. of Germany

[21] Appl. No.: 208,356

[22] PCT Filed: Aug. 7, 1987

[86] PCT No.: PCT/EP87/00432

§ 371 Date: Apr. 27, 1988

§ 102(e) Date: Apr. 27, 1988

[87] PCT Pub. No.: WO88/01801

PCT Pub. Date: Mar. 10, 1988

[30] Foreign Application Priority Data

Aug. 27, 1986 [DE] Fed. Rep. of Germany ....... 3629138
Jul. 31, 1987 [DE] Fed. Rep. of Germany ....... 3725402

[51] Int. Cl.⁴ ............................................ H02K 13/00
[52] U.S. Cl. ...................................... 310/239; 310/42; 310/89; 310/242
[58] Field of Search ............... 310/239, 240, 241, 242, 310/245, 246, 247, 248, 42, 43, 89, 91, 233

[56] References Cited

U.S. PATENT DOCUMENTS

| 1,265,873 | 5/1918 | Berg . | |
|---|---|---|---|
| 3,267,312 | 8/1966 | Redick et al. | 310/239 |
| 3,739,205 | 6/1973 | Winkelmann | 310/42 |
| 3,968,391 | 7/1976 | Blank | 310/240 |
| 4,112,321 | 9/1978 | Wan | 310/43 |

FOREIGN PATENT DOCUMENTS

| 3328683 | 2/1985 | Fed. Rep. of Germany . | |
| 2209239 | 6/1974 | France . | |
| 0179144 | 10/1983 | Japan | 310/239 |

Primary Examiner—R. Skudy
Attorney, Agent, or Firm—Robert P. Seitter

[57] ABSTRACT

For easily assembling an electric motor a locking lug is formed onto the brush support plate. In an assembly position the ratchet lug of said locking lug engages a cavity of the brush and keeps it at a distance from the commutator so that the commutator can easily be installed between the brushes. In order to release the arrest of the brushes during the assembly a releasing part of the locking lug projects into a recess in the housing cover. This arrangement is easy to manufacture and reduced the number of assembly steps.

In a second embodiment the releasing part of the locking lug lies above the front side of the housing cover and projects into a recess in the housing cover lid.

22 Claims, 4 Drawing Sheets

ELECTRICAL MACHINE, ESPECIALLY ELECTRIC MOTOR

BACKGROUND OF THE INVENTION

The invention relates to an electrical machine, especially to an electric motor.

When assembling such machines, a problem experienced towards the end of the assembly process is how to set the commutator, as simply and quickly as possible, between several brushes which are ordinarily resiliently urged toward the commutator. For this purpose normally the brushes are arrested in an assembly position a certain distance from the outer surface of the commutator so that the commutator can freely be set between the brushes. After the assembly of the armature the arrest is released so that the brushes can touch the outer surface of the commutator.

German specification DE-OS 33 28 683 shows an electric motor including a housing cover closed at its front side by a lid, a rotatable armature located within the housing, a commutator, and at least one brush located in a tube which is attached to a brush support plate. The brush is resiliently urged toward its operational position in contact with the commutator. A deflectable locking lug is provided to arrest the brush in an assembly position a certain distance from the commutator. In this specification two different possibilities are taught for deflecting the locking lug to release the arrest of the brushes.

In the first embodiment the housing cover comprises a recess at the level of the brush support plate through which a tool can be inserted after the assembly of the electric motor. By means of this tool the locking lug can be deflected aside to such an extent that it stays deformed and does not spring back into its assembly position. A disadvantage of this embodiment is that the housing wall must comprise an aperture which can only be closed in a further operational step afterwards and that an operational step is necessary for deflecting the locking lug.

In a second embodiment a projection extends the inner side of the housing cover which projection is pushed against the free end of the locking lug during the assembly and releases the arrest of the brushes itself. While this approach requires no aperture in the housing cover, the projection cannot easily be produced. Because the housing cover is normally rolled from a metal blank, forming the projection is especially difficult when design constraints require that it be on a joint or exterior edge of the cover.

SUMMARY OF THE INVENTION

The object of the invention is to form an electrical machine including a rotating armature with a commutator and spring-loaded brushes having releasable locking lugs to arrest the brushes in an assembly position wherein the the separate parts can easily be produced and can be assembled in a simple and time-saving manner.

According to the invention this object is first achieved by providing an easily-manufactured recess in the front side of the housing cover into which the locking lug can project in its releasing position. During assembly, the releasing part of the locking lug can be displaced into the recess towards the front side of the housing cover by an axial movement of the housing cover with respect to the brush support plate. No further operational step for releasing the arrest of the brushes is needed.

If no recess in the housing cover is desired, the object is achieved by making the releasing part of the locking lug extend beyond the front side of the housing cover and by making the releasing part project into the recess in the lid. This solution provides a recess in the lid instead of a recess in the housing cover.

It may be desirable to eliminate voids between the surface of the recess and the releasing part of the locking lug. In such a case, the releasing part may be made to fit the form of the recess to completely close the recess in the housing cover or in the lid.

Where the recess in the housing cover or lid is formed by an opening to the exterior, it may be advantageous to provide a plain exterior surface when the locking lug is in its detensioned (post-assembly) position. This can be achieved by appropriately forming the outer surface of the locking lug to slope so that after the assembly the outer surface is even with the outside of the housing cover and the lid respectively.

It is preferable that the locking lug and brush support plate be be manufactured as an integrated unit from plastic materials.

According to another aspect of the invention, there is no gap between the releasing part and the bottom of the recess in the housing cover. Thereby it is most convenient if the area of the releasing part facing the front side of the housing cover is plainly lying on the front side of the housing cover after the assembly. Thus the areas of the locking lug and of the housing cover are pressed together to such a little extent that the housing cover's engaging into the locking lug, preferably integrally formed with the brush support plate and made of plastics, is possible to a great extent and that thus the locking lug keeps its position for the lifetime of the machine.

According to another aspect of the invention, the releasing part of the locking lug and the housing cover recess are tapered conically. It is thus especially easy to insert the releasing part of the locking lug into the recess of the housing cover. Preferably each locking lug is integrally formed with the brush support plate which can also be identical with the lid.

According to a further aspect of the invention, the locking lug initially extends axially from the brush support plate, and changes into a section by a first curve of about 180° and by a second curve 180° of about 90° in the opposite direction, the latter section being substantially parallel to the brush bearing plate. This improves the spring qualities of the locking lugs, especially in order to achieve a more effective length of the spring reaching up to a ratchet lug of the locking lug engaging into the brush.

According to another aspect of the invention, the recess in the lid may be axially closed on the side turned away from the housing cover or radially closed towards the outside in order to further improve the tightness of the motor housing.

In both embodiments the length of the joints between the locking lug and the lid and the housing cover respectively (the joints being visible from the outside) is considerably reduced so that it is more difficult for moisture and dust to enter the housing. An embodiment of an electrical machine is preferred in which the recess in the lid is both axially and radially closed towards the outside and thus only represents a cavity that is open towards the inner side of the housing. In this case there are no longer contact areas visible from the outside between the locking lug and the lid and the housing cover respectively so that the housing is impermeable to outside foreign matter.

An embodiment in which the locking lug does not extend to the outer surface of the housing cover is also advantageous. The outer surface of the lid can then be in alignment with the outer surface of the housing cover, with the recess radially closed therein. It is apparent from this embodiment that the locking lug need not be acted upon by the complete thickness of the housing cover.

The recess for the releasing part of the locking lug can also be located on the collar of the lid.

In order to prevent the locking lug from disturbing the close fit between the housing cover and the lid, the axial width of the recess is better then the corresponding width of the releasing part of the locking lug. The recess in the lid can be easily manufactured if the lid is produced in an injection-moulding process.

BRIEF DESCRIPTION OF THE DRAWINGS

The invention and further preferred embodiments are illustrated in the following drawings in which.

DETAILED DESCRIPTION OF THE PREFERRED EMBODIMENT

Figure 1:
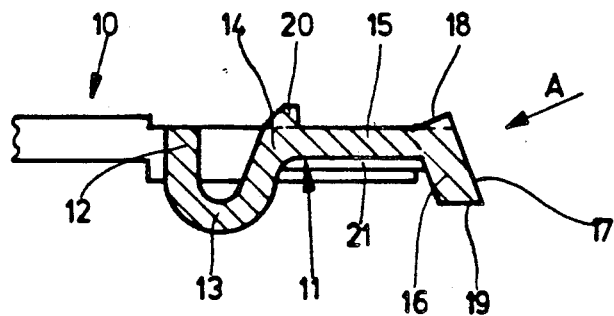
FIG. 1 is a partial section of a brush support plate in the middle of a locking lug being integral with said support plate.

FIG. 1 shows a detailed view of one of two locking lugs 11 which are integrally formed onto a brush support plate 10 made of elastic plastics. The locking lugs 11 diametrically face each other and extend radially. On one side of the brush support plate 10 are mounted tubes 30 (FIGS. 4-7 only) to contain carbon brushes 31 (FIGS. 4-7). The locking lug 11 starts off at an inner ring 12 of the brush support plate 10 and extends axially from the side of said ring opposite that side on which tubes 30 are mounted. Then the locking lug describes a first curve 13 of about 180° and then a further curve 14 of about 90° in the opposite direction which curve 14 changes into a straight section 15 in the axial direction at the level of the inner ring 12. On the free end the locking lug 11 carries a releasing part 16 of which the outer surface 17 is inclined at an angle of about 18° towards the axis of the brush support plate. An upper surface 18 of the releasing part 16 towards one front side of the support plate 10 is perpendicular to the outer surface 17 and is thus inclined at an angle of 72° towards the axis of the support plate 10. At a bend the upper surface 18 changes into an outer surface of the straight section 15 of the locking lug. On the opposite side of the straight section 15 of the locking lug 11 the releasing part 16 extends beyond this straight section 15. There it is limited by a lower surface 19 which is perpendicular to the axis of the brush support plate 10.

Figure 2:
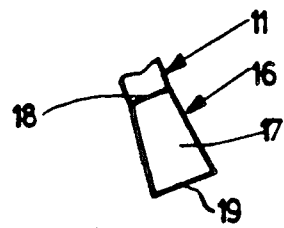
FIG. 2 is a view of the locking lug in the direction of Arrow A of FIG. 1.

FIG. 2 is a detailed end view of the releasing part 16 of the locking lug in the direction of Arrow A of FIG. 1l. The outer surface 17 of the releasing part 16 is shaped in the form of a trapezium with a long side at the intersection with lower surface 19 and a short side at the intersection with upper surface 18. Thus the releasing part 16 gets conically smaller from the lower surface 19 towards the upper surface 18.

Referring again to FIG. 1, the locking lug 11 carries a ratchet lug 20 on the radially inside end of the straight section 15, which ratchet lug 20 is shaped in the form of a saw tooth falling away towards the axis of the brush support plate 10. Radially outside this ratchet lug it is not advantageous to bend the locking lug 11 during the assembly. Therefore the straight section 15 on the side opposite the ratchet lug 20 is strengthened by a rib 21.

Figure 3:
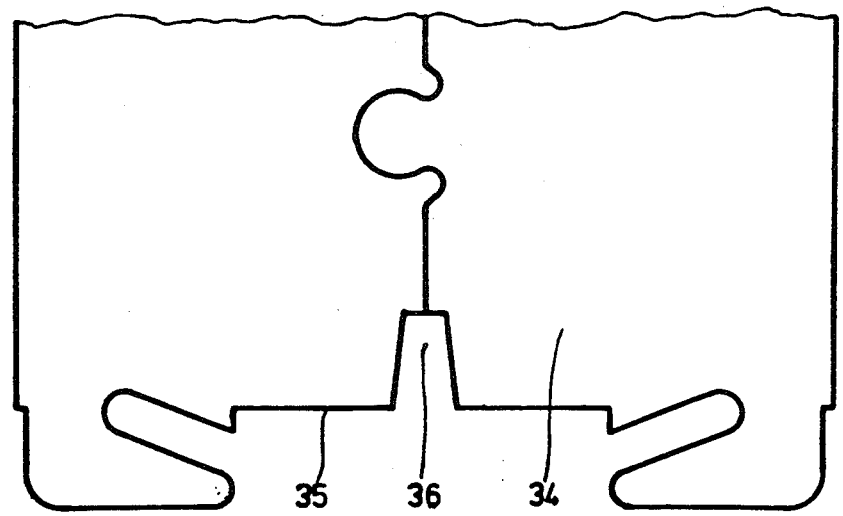
FIG. 3 is a view of the housing cover of an electric motor comprising a recess for the releasing part of the locking lug.

Illustrated in FIG. 3 is part of a housing cover 34 for motor 33 (FIGS. 4-7). The housing cover 34 is rolled of a plain metal. both axial lateral edges of the housing cover 34 act upon each other like a dovetail, as it is usually known. For ease of manufacture, a recess 36 open towards the front side 35 is punched out of the housing cover 34 exactly at the seam of said housing cover 34, which recess 36 gets conically smaller from the front side 35 and its contour corresponds to the contour of the outer surface 17 of the locking lug 11 (FIGS. 1-2).

Figure 4:
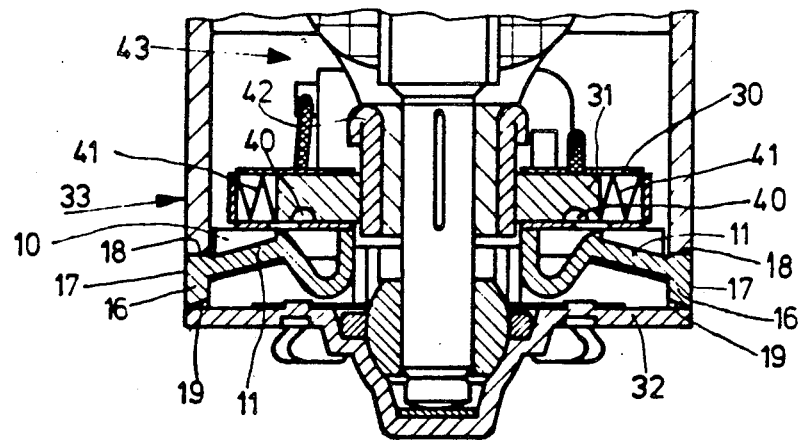
FIG. 4 is a partial section of an electric motor with a brush support plate acording to FIG. 1.

FIG. 4 is a partial section of an electric motor 33 with a brush support plate 10 according to FIG. 1. During the assembly of the electric motor 33, first the brush support plate 10 is complemented with different components, especially with carbon brushes 31 already assembled in metallic tubes 30, and then is fastened to a lid 32 of the housing 34 of the motor 33.

Before the component consisting of the lid 32 and the brush support plate 10 is placed onto the housing cover 34 of the electric motor, the brushes 31 are positioned such that the ratchet lugs 20 of the locking lugs 11 engage a cavity 40 in each carbon brush 31 through an aperture 83 in the tubes 30, which brushes are pushed by springs 41. The ratchet lugs 20 of the locking lugs 11 hold said carbon brushes at a distance which is bigger than the diameter of the commutator 42 of the motor armature 43. The locking lugs 11 are sufficiently long that during the assembly their releasing parts enter a recess 36 (FIG. 3) of the housing cover 34. As the assembly operation continues, the lid 32 and the housing cover 34 are axially moved towards each other. The upper surfaces 18 of the releasing parts 16 meet the bottom of the recesses 36, deflecting the locking lugs 11, and forcing the ratchet lugs 20 out of cavities 40 so that the carbon brushes 31 are pressed against the surface of the commutator 42 by springs 41. In order to ensure that the springs 41 are not hindered by the ratchet lugs 20, the locking lugs 11 are deflected to such an extent that after the assembly the ratchet lugs 20 are totally outside the tubes 30.

During assembly, the locking lugs 11 are deflected to such an extent that afterwards the upper surface 18 of the releasing part 16 is totally lying on the bottom of the recesses 36 in the housing cover 34 and there is no gap. The outer surfaces 17 of the releasing parts 16 are even with the outer surface of the housing cover 34. The lower surface 19 of the releasing parts 16 is inclined towards the front side of the housing cover 34, but there is no gap between it and the lid 32 because the lower surface 19 ascends from outside towards the inner side.

Figure 5:
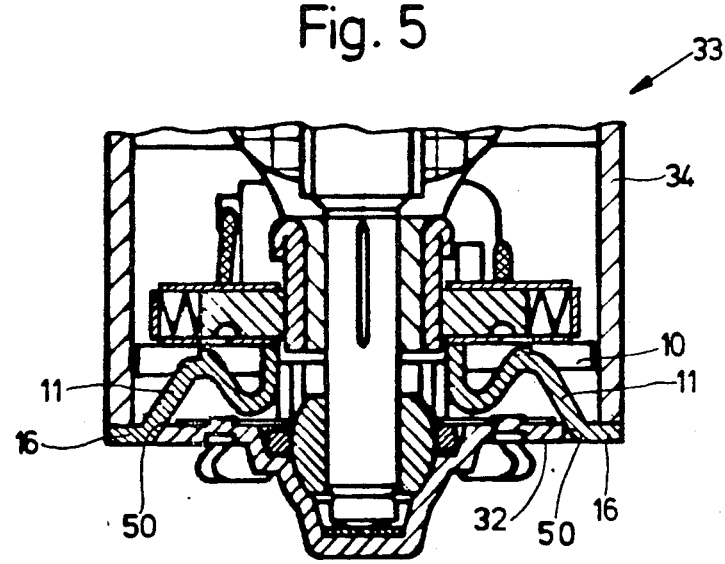
FIG. 5 is a partial section of a second embodiment of an electric motor in which embodiment there are recesses in the lid for the releasing ends of the locking lugs.

In the embodiment illustrated in FIG. 5, recesses for releasing parts 16 of the locking lugs 11 are provided in the lid 32 of the motor housing 33 in stead of the housing cover 34. The principal construction of the locking lugs 11 as well as the principle of the assembly of the component consisting of the lid 32 and of the brush support plate 10 are the same as in the embodiment according to FIGS. 1-4, except that the locking lugs 11 and their releasing parts 16 are formed in such a way that they engage into the recesses 50 of the lid 32 and are even with the outside of the lid and of the housing cover.

Figure 6:
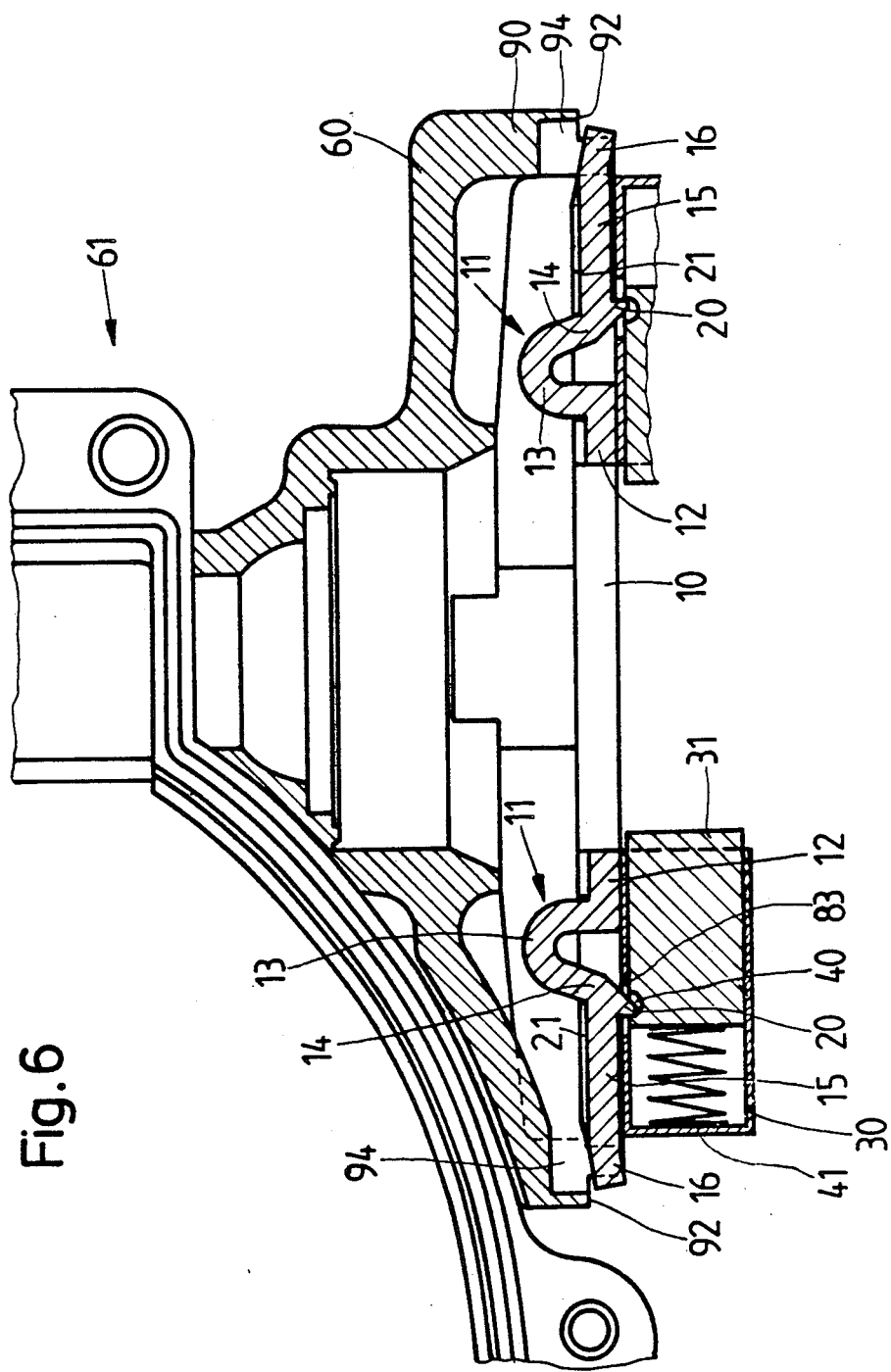
FIG. 6 is the lid of the housing of a motor of a third embodiment, whereby a support plate with brushes arrested by locking lugs is mounted onto the lid.
Figure 7:
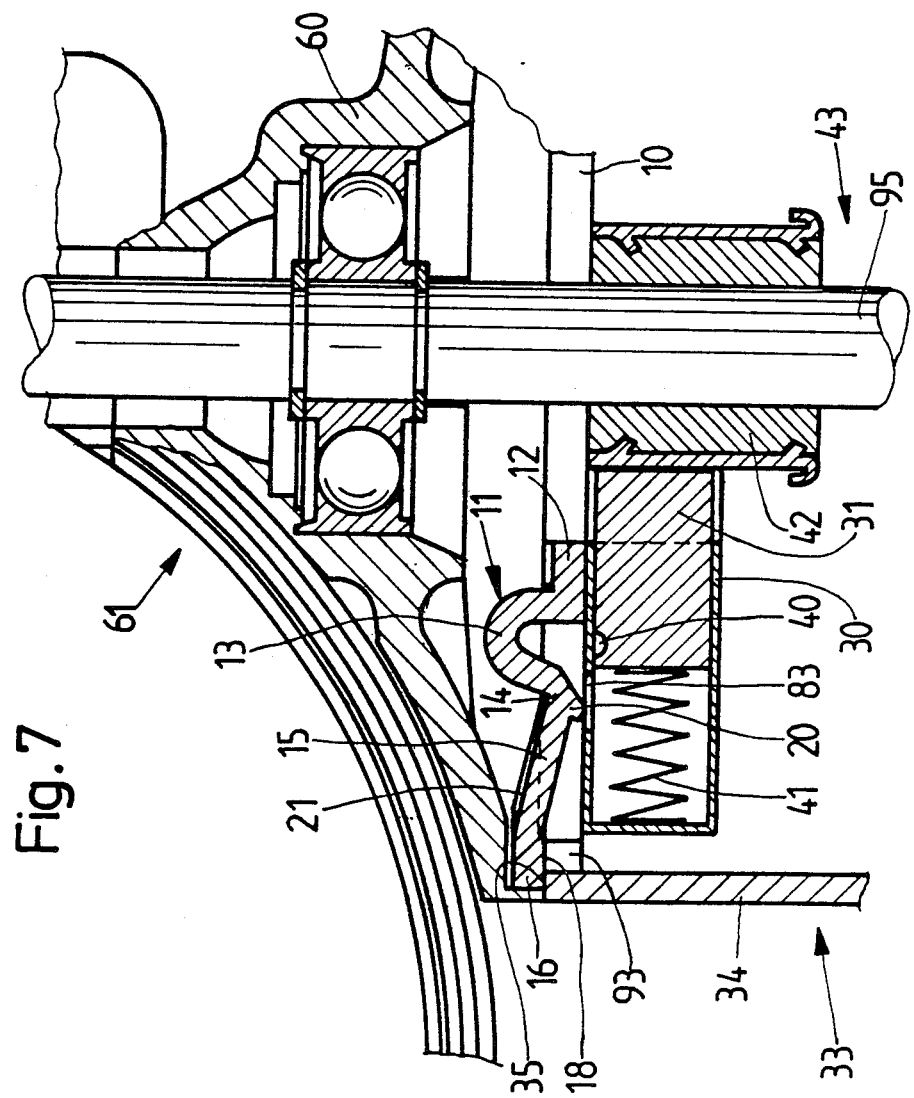
FIG. 7 is the housing of a motor according to FIG. 6 with the lid, housing cover, and brushes in the assembled position.

In the embodiment shown in FIGS. 6 and 7 the lid 60 of a motor housing 33 is integrally formed with a gear housing 61 and is made of a metal or plastic injection-moulding. A brush support plate 10 made of plastics is fastened onto the lid, onto which support plate several long tubes 30 are fixed on the side opposite the lid for the purpose of holding and guiding the brushes 31. The figures only show one complete tube and one complete brush each, since this is sufficient for understanding the invention. The tubes 30 and the brushes 31 can be radially or tangetially arranged with respect to the axis of the brush support plate 10 and of the lid 60.

A certain number of locking lugs 11 corresponding to the number of brushes 31 are integrally formed onto the support plate 10. The locking lug 11 assigned to a tube is arranged in longitudinal direction of the tube and is lying in a plane perpendicular to the support plate 10 and in the middle of the tube 30.

As in the embodiment according to the FIGS. 1 to 4 the locking lug 11 starts off at an inner ring 12 of the brush support plate 10 and extends axially from the side of the brush support plate opposite the side on which the tubes 30 are mounted. The locking lug then describes a first curve 13 of about 180° and then a further curve 14 of about 90° in the opposite direction, which curve 14 changes into a straight section 15 positioned axially at the level of the innver ring 12. On its free end the locking lug 11 carries a releasing part 16.

On the radially inside end of the straight section 15 the locking lug 11 carries a ratchet lug 20, which is shaped in the form of a saw tooth falling away towards the axis of the brush support plate 10. Radially outside this ratchet lug it is not advantageous to bend the locking lug 11 during assembly. Therefore the straight section 15 on the side opposite the ratchet lug 20 is strengthened by a rib 21. Each carbon brush 31 has a cavity on its side facing the brush support plate 10. In each brush holding tube 30 there is an aperture 83 near the ratchet lug 20. The locking lugs 11 are tensioned in the direction of the tubes 30. The locking lug 11 and brush 31 are shown in their assembly position in FIG. 6. The ratchet lug 20 engages the cavity 40 of the carbon brush 31. Spring 41 urges brush 31 toward the axis of the brush support plate 10, but because the ratchet lug 20 is engaged, the brush 31 is held at a distance from the axis of the brush support plate 10 which distance is bigger than the diameter of the commutator 42 (FIG. 7).

A collar 90 is formed onto the lid 60. The outside diameter of this collar 90 corresponds to the outside diameter of a housing cover 34 illustrated in FIG. 7. The collar 90 has an outer shoulder 92 on the front side facing the housing cover 34. The outer dimension of the outer shoulder 92 corresponds to the outer dimension of the housing cover 34. To permit the locking lugs 11 to extend all the way to the area of the outer shoulder 92, the band 93 on the collar 90 touching the shoulder 92 on the inside is cut to form notches in the area of the locking lugs 11. Furthermore the collar 90 has an empty region 94 for each locking lug 11 which empty region 94 radially extends up to the area of the outer shoulder and which is both radially and axially closed towards the outsides of the lid 60. The axial depth of the empty region 94 is a little greater than the width of the releasing part 16 of each locking lug. The largeness of each empty region 94, too, i.e. the measurement in circumferential direction of the lid 60, is little bigger than the largeness of the releasing part 16 of a locking lug 11.

During the assembly of an electric motor according to FIGS. 6 and 7 the brush support plate 10 is first complemented with different components, especially with the metallic tubes 30, the springs 41 and the carbon brushes 31, and then is fastened to the lid 60. The carbon brushes 31 are pushed back into the tubes 30 and are thereby arrested by the locking lugs 11. Then the motor shaft 95 and the collector 42 can be inserted without any difficulties. Finally the housing cover 34 is pushed over the armature of the motor. The front side of the housing cover facing the lid 60 is thereby pushed against the releasing parts 16 of the locking lugs 11 so that the locking lugs are deflected when the lid 60 and the housing cover 34 are pushed together. The ratchet lugs 20 are forced out of the cavities 40 of the carbon brushes 31 so that the carbon brushes are pressed against the outer surface of the commutator 42 by the springs 41. When the housing cover 34 is pushed against the outer shoulder 92 of the housing collar 90, the releasing parts 16 of the locking lugs 11 have entered the empty regions 94 of the collar 90. This final state is represented in FIG. 7. It is apparent that the empty regions 94 in the lid 60 receiving the releasing parts 16 of the locking lugs 11 are completely closed towards the outside so that the motor housing is highly impermeable to foreign matter.

Furthermore it can be seen that the upper surface 18 of the releasing part 16 is completely lying on the front side 35 of the housing cover 34 since the upper surface 18 is sloping in comparison with the straight section 15 of the locking lug 11. So the pressure on the areas is rather small.

Embodiments of an electrical machine according to the invention are also possible to accommodate larger locking lugs and releasing parts than those previously described and shown in FIGS. 5-7. In such embodiments the releasing parts 16 of the locking lugs 11 project into adjacent recesses in both the lid 32 and the housing cover 34.

What is claimed is:

1. An electrical machine, especially an electric motor, comprising a housing cover having an open front side closed by a lid, and an armature rotatably located within the housing cover with a commutator and at least one brush that is located in a tube fixed to a brush support plate and movable in a straight line towards the commutator, the brush resiliently lying on the commutator in its operational position and arranged to be arrested in an assembly position at a certain distance from the commutator by a deflectable locking lug fixed onto the brush support plate, the deflectable locking lug engaging into a cavity formed in the brush, the locking lug having a free end, the locking lug projecting into a recess of the housing cover upon assembly of the motor by means of a releasing part at the free end of the locking lug, the releasing part being engaged by the housing cover to release the brush for movement toward the commutator from the assembly position, and the releasing part completely closes the recess in the housing cover.

2. An electrical machine according to claim 1 wherein an area of the releasing part that can be seen from outside slopes to such an extent—while the locking lug is detensioned—that after the assembly it is even with outside of the housing cover and of the lid respectively.

3. An electrical machine according to claim 1, the releasing part and housing cover each having a post-assembly position in which a surface of the releasing part facing the front side of the housing cover is sloping to such an extent—while the locking lug is detensioned—at an angle different from 90°, with respect to the axis of the brush support plate that it is lying on the outer edge of the front side of the housing cover.

4. An electrical machine according to claim 3 wherein, in said post-assembly position, the surface of the releasing part facing the front side of the housing cover is totally lying on the front side of the housing cover.

5. An electrical machine according to claim 1 wherein, the recess in the housing cover gets concially smaller from the front side of the housing cover onwards and that the releasing part of the locking lug has a corresponding form.

6. An electrical machine according to claim 1 wherein the locking lug is integrally formed onto the brush support plate at its end towards the commutator.

7. An electrical machine according to claim 6, wherein the locking lug goes off the brush support plate in axial direction and that it changes into a section by a first curve of about 180° and by a second curve of about 90° in the opposite direction which section is substantially in parallel to the brush support plate.

8. An electrical machine according to 1 wherein the recess is in a collar of the lid.

9. An electrical machine according to claim 1 wherein the lid is made by injection-moulding.

10. An electrical machine, especially an electric motor, comprising a housing cover having an open front side closed by a lid, and an armature rotatably located within the housing cover with a commutator and at least one brush that is preferably located in a tube fixed to a brush support plate and movable in a straight line towards the commutator, the brush resiliently lying on the commutator in its operational position and arranged to be arrested in an assembly position at a certain distance from the commutator by a deflectable locking lug fixed on the brush support plate, the deflectable locking lug engaging into a cavity formed in the brush, the locking lug extending beyond the front side of the housing cover at its free end by means of a releasing part, the releasing part projecting into a recess of the lid upon assembly of the lid and the cover to release the brush for movement toward the commutator from the assembly position.

11. An electrical machine according to claim 10 wherein the releasing part completely closes the recess in the lid respectively.

12. An electrical machine according to claim 10 wherein the recess in the lid is axially closed on the side turned away from the housing cover.

13. An electrical machine according to claim 10 wherein the recess in the lid is radially closed towards the outside.

14. An electrical machine according to claim 12 wherein the locking lug radially ends in front of the housing cover.

15. An electrical machine according to claim 12 wherein the axial measurement of the recess is bigger than the corresponding measurement of the releasing part of the locking lug.

16. An electrical machine according to claim 10 wherein the releasing part completely closes the recess in the housing cover and the lid respectively.

17. An electrical machine according to claim 10 wherein an area of the releasing part that can be seen from outside slopes to such an extent—while the locking lug is detensioned—that after the assembly it is even with outside of the housing cover and of the lid respectively.

18. An electrical machine according to claim 10, the releasing part and housing cover each having a post-assembly position in which a surface of the releasing part facing the front side of the housing cover is sloping to such an extent—while the locking lug is detensioned—at an angle different from 90°, with respect to the axis of the brush support plate that it is lying on the outer edge of the front side of the housing cover.

19. An electrical machine according to claim 18 wherein, in said post-assembly position, the surface of the releasing part facing the front side of the housing cover is totally lying on the front side of the housing cover.

20. An electrical machine according to claim 10 wherein the recess in the housing cover gets conically smaller from the front side of the housing cover onwards and that the releasing part of the locking lug has a corresponding form.

21. An electrical machine according to claim 10 wherein the locking lug is integrally formed onto the brush support plate at its end toward the commutator.

22. An electrical machine according to claim 21 wherein the locking lug goes off the brush support plate in axial direction and that it changes into a section by a first curve of about 180° and by a second curve of about 90° in the opposite direction which section is substantially in parallel to the brush support plate.

* * * * *